(12) United States Patent
Li et al.

(10) Patent No.: US 7,460,082 B2
(45) Date of Patent: Dec. 2, 2008

(54) SECTORED ANTENNA SYSTEMS FOR WLAN

(75) Inventors: Qinghua Li, Sunnyvale, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/749,665

(22) Filed: Dec. 30, 2003

(65) Prior Publication Data

US 2005/0146470 A1   Jul. 7, 2005

(51) Int. Cl.
*H01Q 21/00* (2006.01)
*H04B 1/38* (2006.01)

(52) U.S. Cl. .................... 343/893; 455/561
(58) Field of Classification Search ............. 343/702, 343/757, 767, 770, 893, 844; 370/310, 312, 370/277; 342/360; 455/426.2, 456.1, 561
See application file for complete search history.

(56) References Cited

U.S. PATENT DOCUMENTS

| | | | | |
|---|---|---|---|---|
| 5,548,807 A | * | 8/1996 | Ueda | ............ 370/334 |
| 6,473,036 B2 | * | 10/2002 | Proctor, Jr. | .................. 342/372 |
| 6,707,425 B2 | * | 3/2004 | Louhi | .......................... 342/359 |
| 6,933,887 B2 | * | 8/2005 | Regnier et al. | .............. 342/372 |
| 6,959,209 B2 | | 10/2005 | Fang | |
| 6,996,418 B2 | | 2/2006 | Teo et al. | |
| 2002/0164963 A1 | * | 11/2002 | Tehrani et al. | .............. 455/101 |
| 2004/0023665 A1 | * | 2/2004 | Simmonds et al. | ........ 455/456.1 |
| 2004/0038713 A1 | * | 2/2004 | Okawa et al. | ............... 455/561 |
| 2004/0077361 A1 | * | 4/2004 | Ishidoshiro | .............. 455/456.3 |
| 2004/0196813 A1 | * | 10/2004 | Ofek et al. | .................. 370/334 |
| 2004/0196834 A1 | * | 10/2004 | Ofek et al. | .................. 370/352 |

FOREIGN PATENT DOCUMENTS

| | | |
|---|---|---|
| EP | 0802579 A2 | 10/1997 |
| EP | 1063789 A1 | 12/2000 |
| WO | 03/026221 A1 | 3/2003 |
| WO | 2004/073257 A2 | 8/2004 |

* cited by examiner

*Primary Examiner*—Thuy Vinh Tran
(74) *Attorney, Agent, or Firm*—Kacvinsky LLC

(57) ABSTRACT

An access point may use two omni-directional antennas or one omni-directional antenna and multiple sectored antennas in a communications network. The mobile stations may use sectored antennas. The omni-directional antennas may include two or more sectored antennas.

12 Claims, 4 Drawing Sheets

SECTORED ANTENNA SYSTEMS FOR WLAN

Sectored antennas have been employed in the base station or access point of wireless systems to improve the performance of wireless communications. But generally, sectored antennas are not employed in mobile stations. Instead, Wireless Local Area Networks (WLAN) employ two omni-direction antennas that are mounted on a laptop computer to provided spatial diversity to combat multipath fading. However, the actual radiation pattern is far from omni directional once the antennas are mounted on the laptop. Thus, the omni-direction antennas may provide poor coverage regions that result in deep nulls in the actual radiation pattern and significantly degrade the performance. An antenna system providing a pattern that significantly improves the performance is needed for devices operating in a WLAN network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
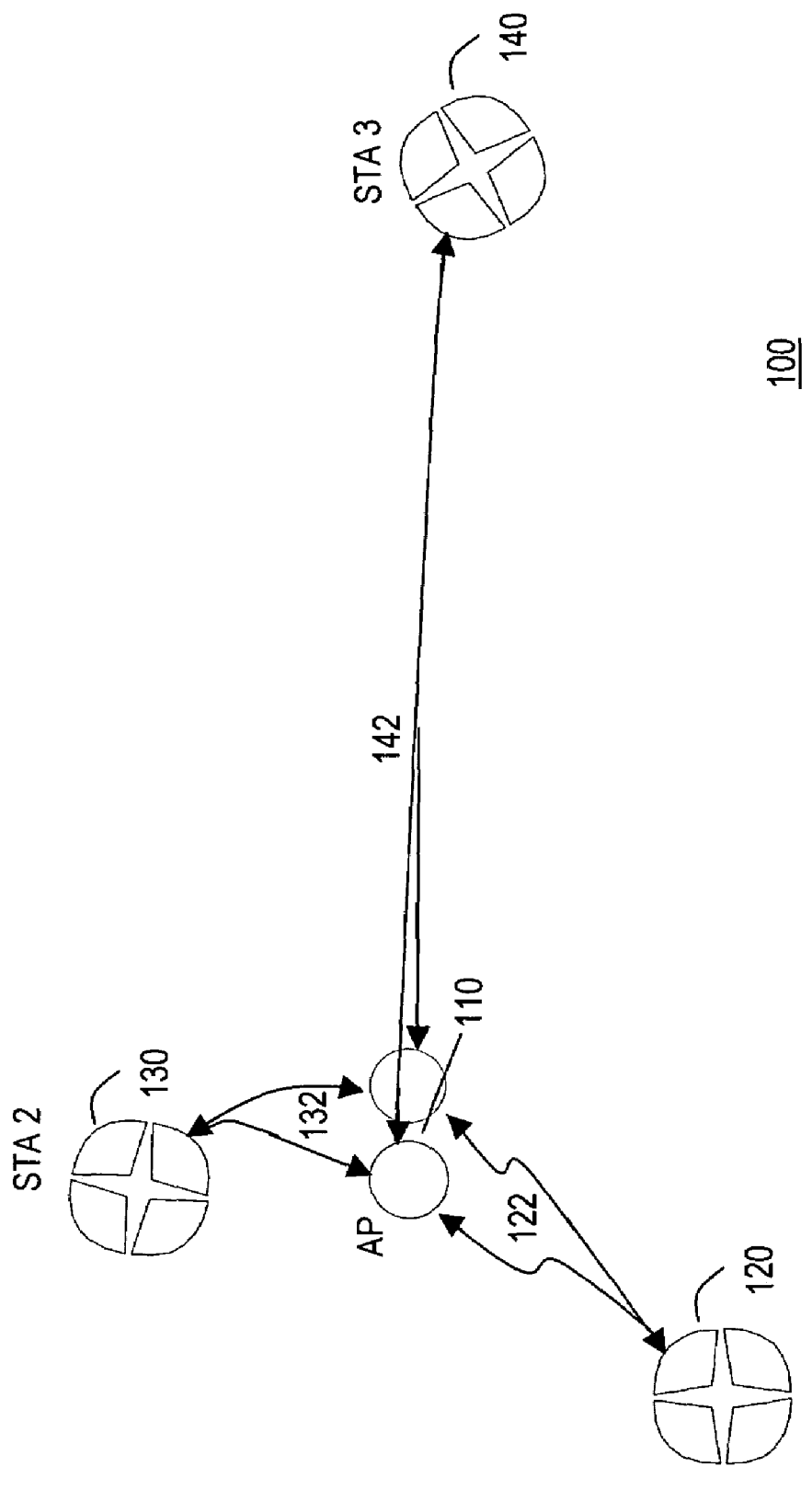
FIG. 1 illustrates antenna radiation patterns in a WLAN network where an Access Point (AP) uses two omni-directional antennas and the mobile stations use sectored antennas in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates antenna radiation patterns in a network 100 that includes an Access Point (AP) 110 and mobile stations (STA) 120, 130 and 140. In some embodiments, wireless network 100 is a Wireless Local Area Network (WLAN). For example, one or more of mobile stations 120, 130 and 140 and access point 110 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. Mobile stations 120, 130 and 140 may be any type of mobile station capable of communicating in network 100. For example, the mobile stations may be computers, personal digital assistants, wireless-capable cellular phones, home audio or video appliances, or the like.

Access point 110 communicates with mobile station 120 (also referred to as "STA1") using signal 122. Access point 110 may also communicate with mobile station 130 (also referred to as "STA2") using signal 132, and access point 110 may further communicate with mobile station 140 (also referred to as "STA3") using signal 142. Signals 122, 132 and 142 are transmitted through a wireless channel in free space between the access point and the various mobile stations, and in this embodiment, access point 110 uses two omni-directional antennas and the mobile stations (STA) 120, 130 and 140 use sectored antennas in accordance with the present invention.

Figure 2:
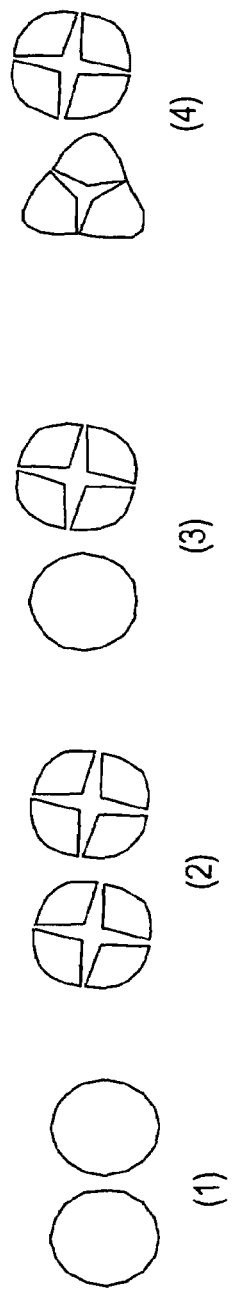
FIGS. 2 and 3 illustrate antenna radiation patterns in a WLAN network where an Access Point (AP) uses both an omni-directional and sectored antennas, where one sector corresponds to one sectored antenna in the figures.
Figure 3:
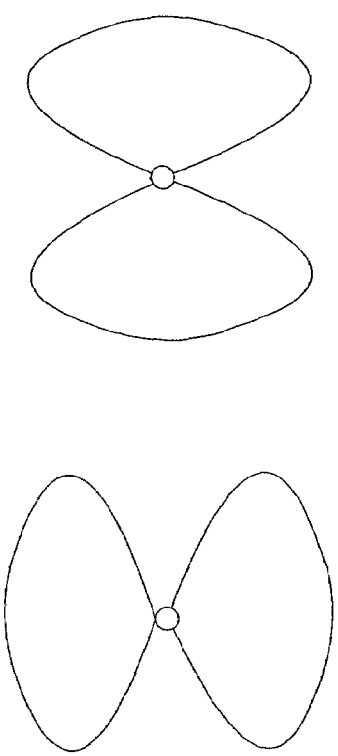

FIGS. 2 and 3 illustrate antenna radiation patterns in a WLAN network where an Access Point (AP) uses both an omni-directional and sectored antennas, where one sector corresponds to one sectored antenna. Only one antenna is usually selected to use at any time but multiple sectored antennas may be used simultaneously to form a virtual omni-directional antenna. The mobile stations only use sectored antennas in accordance with the present invention.

Referring to FIG. 2, at access point 110 the antennas may be configured as: (1) two omni-directional antennas; (2) two or more sectored antennas (e.g. four sectored antennas and a virtual omni-directional antenna formed by the four sectored antennas); (3) one dedicated omni-directional antenna (not formed by sectored antennas) and more than two sectored antennas; or (4) two or more sets of sectored antennas such that at least one set forms an omni-directional antenna.

It should be pointed out that the sectors are not necessarily the same size. For example, when considering the four sectored antennas in (2), one sector may substantially cover about 50 degrees with higher antenna gain and another sector may cover about 110 degrees with lower antenna gain, although this radiation pattern is not a limitation of the present invention. Certainly other antenna radiation patterns and antenna combinations are anticipated. By appropriately mounting the sectored antennas in an appropriate manner, the combination of various sectors may cover a radiation pattern of 0–360 degrees as an effective omni-directional antenna. It should further be pointed out that mobile stations 120, 130 and 140 may have antenna typically configured with only two or more sectored antennas.

Referring to FIG. 3, the sectored antennas or a subset of the sectored antenna at both access point 110 and mobile stations 120, 130 and 140 may be usually placed in a manner such that the main radiation peaks are complementary to each other. Overlapping in the coverage angles is usually introduced deliberately and is beneficial to obtain diversity gain. The coverage size of each sectored antenna may be different when compared to each other due to the physical limitations in the antenna mounting. The issues apply to both the access point and the mobile stations. This figure illustrates an antenna configuration with two sectored antennas. The two antennas may be placed in a complementary direction to cover 360 degrees with overlapping. The antenna radiation pattern is typical for a slot antenna, which covers two opposite directions.

In one embodiment, two omni-directional antennas are employed at the access point and sectored antennas are employed at the mobile stations to provide spatial diversity to combat multipath fading. Signal quality may dramatically vary over the antennas, so one of the two antennas is selected for both transmission and reception. In this switched antenna system, the antenna with the best signal quality is selected to improve the transceiver's performance compared to that of a single antenna. This difference of antenna signal qualities is usually referred to as antenna diversity gain.

In the infrastructure mode the initial RTS/CTS exchange verifies that there is no collision and reserves the channel. This two-way exchange may be used as a training cycle with the mobile station selecting the sectored antenna that has received the best access point signal. Alternatively, each of the mobile stations may use a selection algorithm to select the sectored antenna with the best signal quality.

In the direct link or ad-hoc mode, the access point may send out Null-Data packets to the mobile station. The Null-Data packet received through the sectored antennas of the mobile station may be used to determine the sectored antenna with the best signal. The mobile station then uses that selected sectored antenna to transmit the ACK packet back to the access point. The access point receives the ACK packet and through a selection process, selects the omni-directional antenna with the best ACK signal quality to send subsequent data packets. Note that the omni-directional antenna used by access point 110 may be formed by the combination of multiple sectored antennas and used to send beacons in the network.

Note that the sectored antennas may have low gain at the opposite direction of its pointing direction, and therefore, mobile stations located in the opposite direction may not be able to detect the transmission in the point direction. This may allow the RTS/CTS exchange between the access point and one of the mobile stations to remain unverified and the channel unreserved. Other mobile stations may then contend for the occupied medium. Fortunately, the sectored antenna for the "initiator" usually faces the sectored antenna at the "responder". By sending the RTS and CTS, the "initiator" and "responder" may notify the other mobile stations of the coming data packets.

Figure 4:
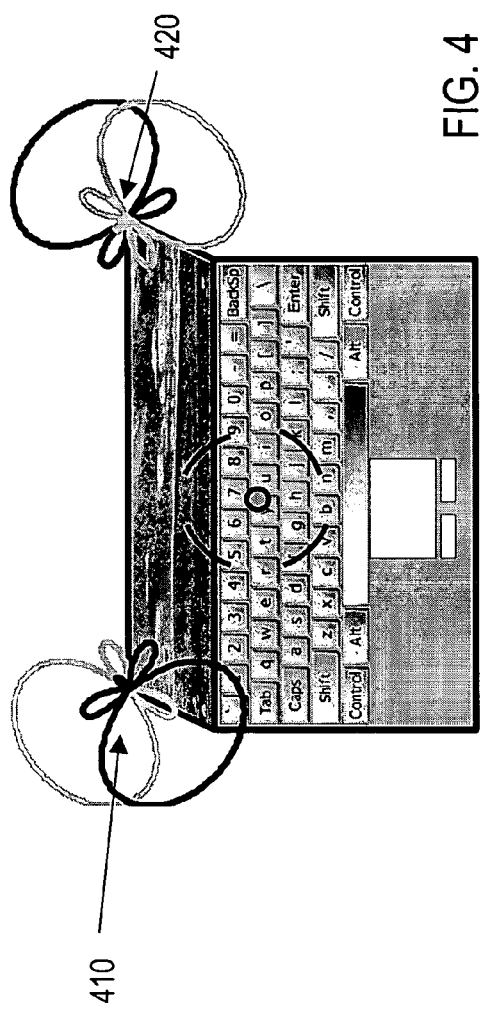
FIG. 4 illustrates antenna radiation patterns for four antennas, with two antennas placed in each of the upper corners of a display of a laptop computer.

FIG. 4 shows antenna radiation patterns for two antennas 410 and another two antennas 420 placed in the upper corners of the display of a laptop computer. The placement of sectored antennas is important to avoid interference coming from a (notebook) computer. The computer itself radiates significant interference signals (e.g. clock signals, bus signals) that cover the WLAN bands. To avoid picking up the interferences, the sectored antennas are not placed at the same spot on the computer, but rather distributed and pointing outward as shown in the figure.

Figure 5:
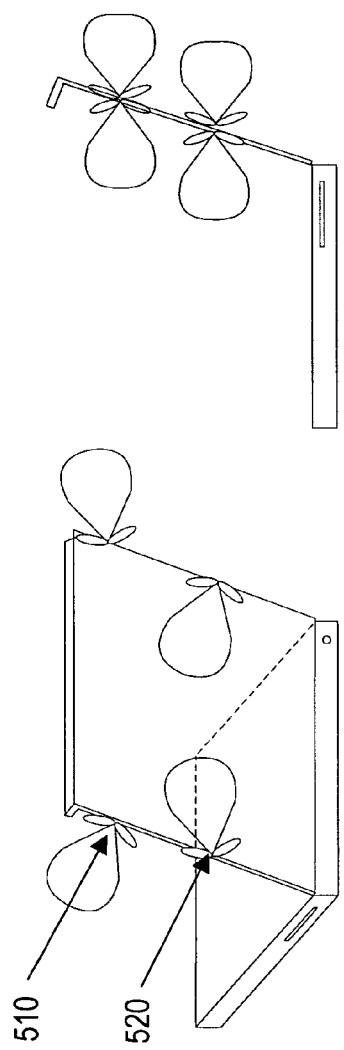
FIG. 5 illustrates antenna radiation patterns for four antennas placed at the upper portions of the two side edges of the display rather than at the corners.

FIG. 5 illustrates antenna radiation patterns for four antennas placed at the upper portions of the two side edges of the display rather than at the corners. The placement of the sectored antennas differs from the embodiment shown in FIG. 4 in that in FIG. 4 shows two antennas squeezed at each of the two corners, while in FIG. 5 the two antennas are spatially and vertically separated. Again, antennas 510 and 520 placed along one side of the display of a laptop computer show the sectored antennas pointing outward as shown in the figure.

Figure 6:
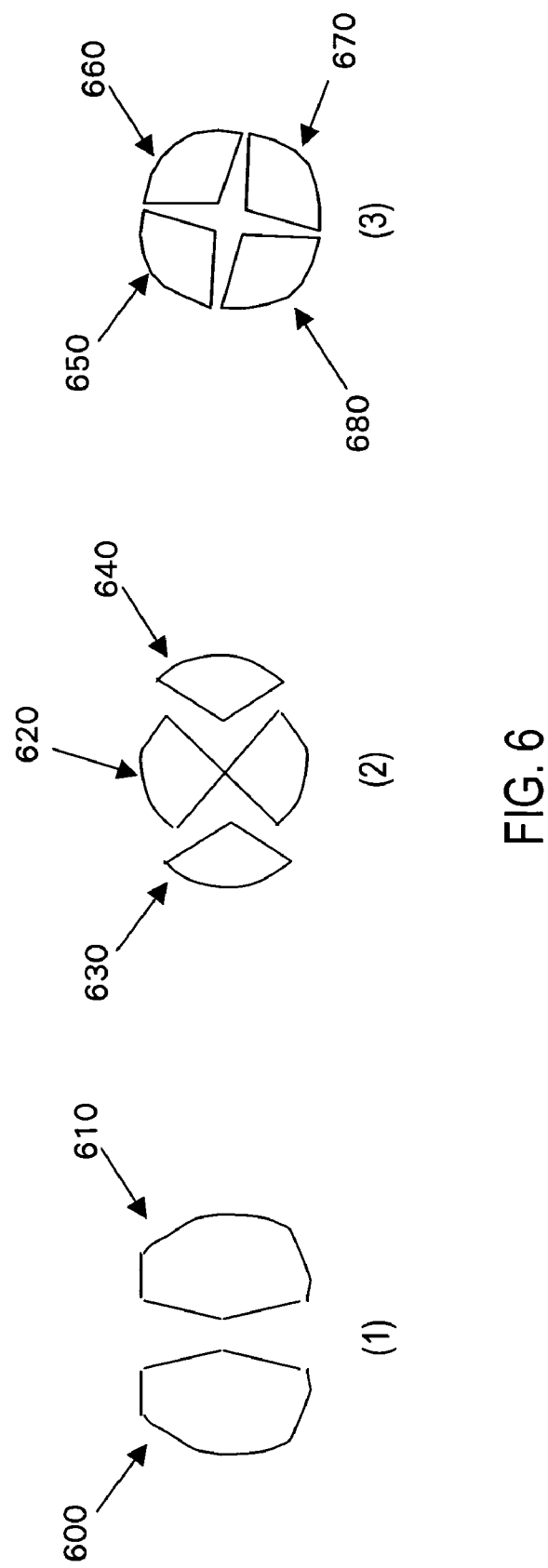
FIG. 6 illustrates various embodiments of sectored antennas.

FIG. 6 illustrates various embodiments of sectored antennas that may be placed along the sides of the display of a laptop computer. The embodiment labeled (1) has two sectored antennas, with sectored antenna 600 and 610 each covering at least 180 degrees. Another embodiment labeled (2) has three sectored antennas, with sectored antenna 630 and 640 covering substantially 90 degrees and sectored antenna 620 covering about 180 degrees as shown in the figure. Yet another embodiment labeled (3) has four sectored antennas, with sectored antennas 650, 660, 670 and 680 each covering at least 90 degrees.

It should be pointed out that the use of multiple sectored antennas to form an omni-directional antenna allows Cyclic Delay Diversity (CDD) techniques to be employed. The sectored antennas described herein for access point 110 may use CDD. In particular, the first sectored antenna may provide a non-delayed signal, while the second sectored antenna, or each additional sectored antenna, may provide a cyclically shifted version of the signal for transmission.

The use of multiple sectored antennas to form an omni-directional antenna provides further advantages in a multi-band system where information on each of the sub-bands may be transmitted using either single-carrier (pulse-based) or multi-carrier Orthogonal Frequency Division Multiplexing (OFDM) techniques. By interleaving the symbols across sub-bands, Ultra WideBand (UWB) systems may maintain the same transmit power as if they were using the entire bandwidth. Each sector of the sectored antennas may be used to transmit information on particular sub-bands. In other words, different sectored antenna may transmit different tones.

By now it should be apparent that an RF system may be enhanced using features of the present invention. The access point may use two omni-directional antennas or one omni-directional antenna and sectored antennas, while the mobile stations use sectored antennas. Further, the omni-directional antennas may include two or more sectored antennas.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A communications network, comprising:
a mobile device having at least two omni-directional antennas, where a first omni-directional antenna is formed by a combination of multiple sectored antennas and the at least two omni-directional antennas use different tones.

2. The communications network of claim 1, where the combination of multiple sectored antennas includes a first sectored antenna having a sector to cover a radiation pattern of substantially 0 to 90 degrees and another sector to cover a radiation pattern of substantially 180 to 270 degrees.

3. The communications network of claim 2, where the combination of multiple sectored antennas includes a second sectored antenna having a sector to cover a radiation pattern of substantially 90 to 180 degrees and another sector to cover a radiation pattern of substantially 270 to 360 degrees.

4. The communications network of claim 1, where the combination of multiple sectored antennas includes first and second sectored antennas, the first sectored antenna having a radiation pattern of substantially 0 to 180 degrees and the second sectored antenna having a radiation pattern of substantially 180 to 310 degrees.

5. The communications network of claim 1, wherein the combination of multiple sectored antennas includes three sectored antennas having radiation patterns that combine to form the first omni-directional antenna.

6. The communications network of claim 5, wherein the three sectored antennas include a first sectored antenna having a radiation pattern of substantially 0 to 90 degrees, a second sectored antenna having radiation patterns to cover substantially 90 to 180 degrees and 270 to 310 degrees, and a third sectored antenna having a radiation pattern of substantially 180 to 270 degrees.

7. The communications network of claim 1, wherein the combination of multiple sectored antennas includes four sectored antennas having radiation patterns that combine to form the first omni-directional antenna.

8. The communications network of claim 7, wherein the four sectored antennas each cover a radiation pattern of about 0 degrees to 90 degrees and are appropriately positioned to form the first omni-directional antenna.

9. A receiver system of an access point, comprising:
two omni-directional antennas coupled to a receiver of the access point, where at least one of the two omni-directional antennas is a combination of two complimentary placed sectored antennas.

10. The receiver system of claim 9, wherein the two omni-directional antennas allow Cyclic Delay Diversity (CDD) techniques to be employed.

11. The receiver system of claim 9, wherein a first omni-directional antenna is placed in one corner of a display for a laptop computer and a second omni-directional antenna is placed in another corner of the display.

12. The receiver system of claim 9, wherein a first omni-directional antenna is placed along one side of a display for a laptop computer and a second omni-directional antenna is placed along another side of the display.

* * * * *

UNITED STATES PATENT AND TRADEMARK OFFICE
CERTIFICATE OF CORRECTION

PATENT NO.        : 7,460,082 B2  
APPLICATION NO.   : 10/749665  
DATED             : December 2, 2008  
INVENTOR(S)       : Li et al.

Page 1 of 1

It is certified that error appears in the above-identified patent and that said Letters Patent is hereby corrected as shown below:

In column 4, line 67, in Claim 4, delete "310" and insert -- 360 --, therefor.

In column 5, line 9, in Claim 6, delete "310" and insert -- 360 --, therefor.

Signed and Sealed this

Thirty-first Day of March, 2009

JOHN DOLL  
*Acting Director of the United States Patent and Trademark Office*